United States Patent [19]

Kang

[11] Patent Number: 5,512,891
[45] Date of Patent: Apr. 30, 1996

[54] DRIVE-UP STATION VEHICLE DETECTION SYSTEM AND METHOD OF USING SAME

[75] Inventor: Chao M. Kang, San Diego, Calif.

[73] Assignee: H. M. Electronics, Inc., San Diego, Calif.

[21] Appl. No.: 237,625

[22] Filed: May 4, 1994

[51] Int. Cl.[6] .................................................. G08G 1/01
[52] U.S. Cl. .......................... 340/941; 340/933; 340/939; 364/436
[58] Field of Search ................................. 340/933, 939, 340/941; 364/436; 324/236

[56] References Cited

U.S. PATENT DOCUMENTS

| | | | |
|---|---|---|---|
| 3,863,206 | 1/1975 | Rabie | 340/939 |
| 3,873,964 | 3/1975 | Potter | 340/939 |
| 3,989,932 | 11/1976 | Koerner | 340/939 |
| 4,131,848 | 12/1978 | Battle | 340/941 |
| 4,568,937 | 2/1986 | Clark | 340/939 |
| 4,862,162 | 8/1989 | Duley | 340/941 |

*Primary Examiner*—Brent A. Swarthout
*Assistant Examiner*—Edward Lefkowitz
*Attorney, Agent, or Firm*—Bernard L. Kleinke; Jerry R. Potts; Peter P. Scott

[57] ABSTRACT

A method and apparatus for detecting objects disposed in close proximity to a conductive loop, includes the use of a sensitivity selection circuit to compensate for loop sensitivity to metal and other conditions, and a microprocessor circuit for helping to prevent false detections or undesired interruptions of valid detection due to changes in environmental conditions.

26 Claims, 8 Drawing Sheets

DRIVE-UP STATION VEHICLE DETECTION SYSTEM AND METHOD OF USING SAME

TECHNICAL FIELD

The present invention relates in general to an object detection system, and method of using it. The invention more particularly relates to a vehicle detection system for use in drive-up businesses, such as fast food restaurants, banks, and other commercial establishments.

BACKGROUND ART

The art of vehicle detection by drive-up loops is well known and has gained widespread recognition by drive-up businesses, such as fast food restaurants, drive-up bank teller systems and others. As representative examples of loop detectors, reference may be made to the following U.S. Pat. Nos. 2,601,472; 3,164,802; 3,389,717; 3,530,434; 3,564,219; 3,581,068; 3,609,247; 3,614,729; 3,651,452; 3,652,832; 3,663,938; 3,665,382; 3,685,013; 3,818,430; 3,820,100; 3,868,626; 3,873,964; 3,875,555; 3,900,829; 3,942,108; 3,943,339; 3,980,867; 3,989,932; 3,996,555; 4,038,633; 4,131,848; 4,201,908; 4,231,114; 4,247,947; 4,251,797; 4,296,401; 4,311,876; 4,352,183; 4,358,749; 4,391,119; 4,392,119; 4,430,636; 4,471,356; 4,472,706; 4,491,841; 4,529,982; 4,568,937; 4,630,044; 4,639,689; 4,668,951; 4,680,717; 4,714,925; 4,731,867; 4,754,277; 4,862,162; 4,873,494; 4,920,340; 4,926,494; 4,996,716; 5,028,921; 5,089,815; 5,153,525; 5,184,350; 5,198,811; 5,220,677; 5,247,297; 5,278,555; and 5,281,965.

In such systems, a vehicle drives up or across a designated detection area, such as a remote order taking station for placing a food or drink order without entering a fast food restaurant. A conductive wire loop embedded in the detection area has a given inductance which changes as a result of the vehicle coming in close proximity to the inductive loop.

This change in inductance, in turn, causes a loop detection system to generate an alarm signal which alerts an order taker that a customer is present at the remote order taking station.

While such systems have been satisfactory for certain applications, they have not always proven to be entirely reliable. In this regard, the amount of the inductance change associated with any given inductive loop is dependent upon the size and shape of the vehicle crossing the loop, the metallic content of the vehicle, the depth the loop is embedded within the surface, the size and shape of the conductive loop, and the effects of climatic conditions, such as rain, snow, humidity, and other similar conditions.

The aforesaid lack of reliability of the prior known systems is due to the resonance sensitivity of the detection circuits which sense the changes in inductance in the loop. In this regard, such detection circuits have not been capable of reliably sensing relatively small inductance changes in the loop.

One possible solution to the inherent lack of sensitivity is disclosed in U.S. Pat. No. 3,875,555, which describes an oscillation detection circuit utilizing a direct frequency measurement approach, rather than measuring a phase shift change or amplitude change in the output of the system oscillator as its tank circuit is mistuned out of resonance. Such an approach has not been entirely satisfactory. In this regard, the disclosed prior art system is very expensive as it required the use of not only two oscillators, a reference oscillator and a loop oscillator, but also require expensive tracking circuits to compensate for environmental drift conditions.

Another problem associated with the reliability of such prior art systems is the difficulty in tuning the reference frequency oscillator with the loop oscillator to compensate for the environmental drift conditions. In this regard, in order to detect properly a frequency difference between the two oscillators, they must initially be tuned to the same frequency. However, because the output frequency of the loop oscillator is a function of the size and shape of the conductive loop, the depth at which the loop is embedded within the surface, and the environmental conditions at the time of installation, it is difficult, if not impossible, to tune the two oscillators to substantially the same frequency.

Therefore, it would be highly desirable to have a vehicle detection system suitable for use at a variety of drive-up stations having different size and shape inductive loops, under a variety of weather conditions. Such a system should enable the detection of a motor vehicle in a reliable manner, even though the loops may be embedded at different depth in their associated drive-up lanes. Moreover, such a system should be convenient to use and install and not be unduly expensive to manufacture.

DISCLOSURE OF INVENTION

Therefore, the principal object of the present invention is to provide a new and improved method and apparatus for detecting a motor vehicle at a drive-up station of a commercial establishment in a very reliable manner.

Another object of the present invention is to provide a new and improved detection method and apparatus that is relatively easy to install and use in a convenient manner.

Another object of the present invention is to provide a new and improved detection method and apparatus for preventing false detections or interruptions of valid detections due to changes in environmental conditions.

Briefly, the above and further objects and features of the present invention are realized by providing a method and apparatus for detecting objects disposed in close proximity to a inductive loop. The system includes a sensitivity selection circuit to compensate for loop sensitivity to metal and other conditions, and a microprocessor circuit for helping to prevent false detections or undesired interruptions of valid detection due to changes in environmental conditions.

A loop oscillator coupled to the conductive wire loop generates two different frequency rates during a non-detection time period interval and a detection time period interval respectively. During the non-detection time period interval, a frequency averaging circuit determines a reference frequency rate to help prevent false detections during the non-detection time period interval. During the detection time period interval a drift detection circuit cooperates with a drift compensation circuit for changing the reference frequency rate by a small incremental value to help prevent false detections resulting from external changes in temperature and humidity during the name detection time period interval and to help prevent interruption of a valid detection resulting from external changes in temperature and humidity during the detection time period interval.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
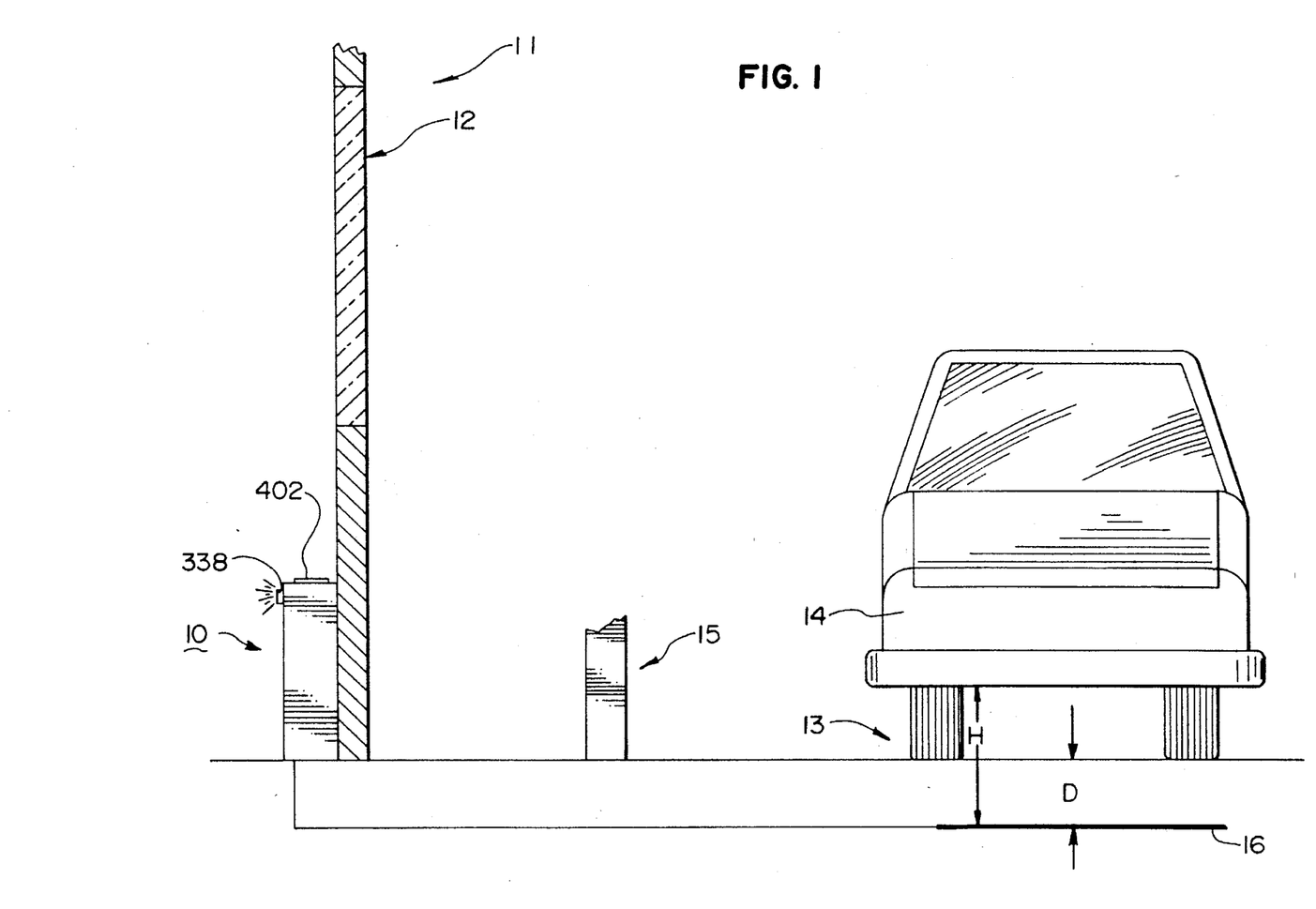
FIG. 1 is a diagrammatic partially broken away view of a vehicle detection system which is constructed in accordance with the present invention.

Referring now to the drawings and more particularly to FIG. 1 thereof, there is illustrated a vehicle detection system 10, which is constructed in accordance with the present invention, and which is adapted for use at a commercial establishment 11 having an order taking window 12 disposed adjacent to a drive-up lane 13 with a conductive wire loop 16 embedded therewithin. Thus, the system 10 can be used in a fast food restaurant or other similar commercial establishment requiring detection of a customer at the drive up window 12 or a remote station 15 for communication purposes.

While the preferred form of the present invention is designed for use at a fast food restaurant, it will become apparent to those skilled in the art that the principles of the present invention may be employed for other applications as well. For example, such as at a banking facility where money transactions are handled at a drive-through system.

Figure 2:
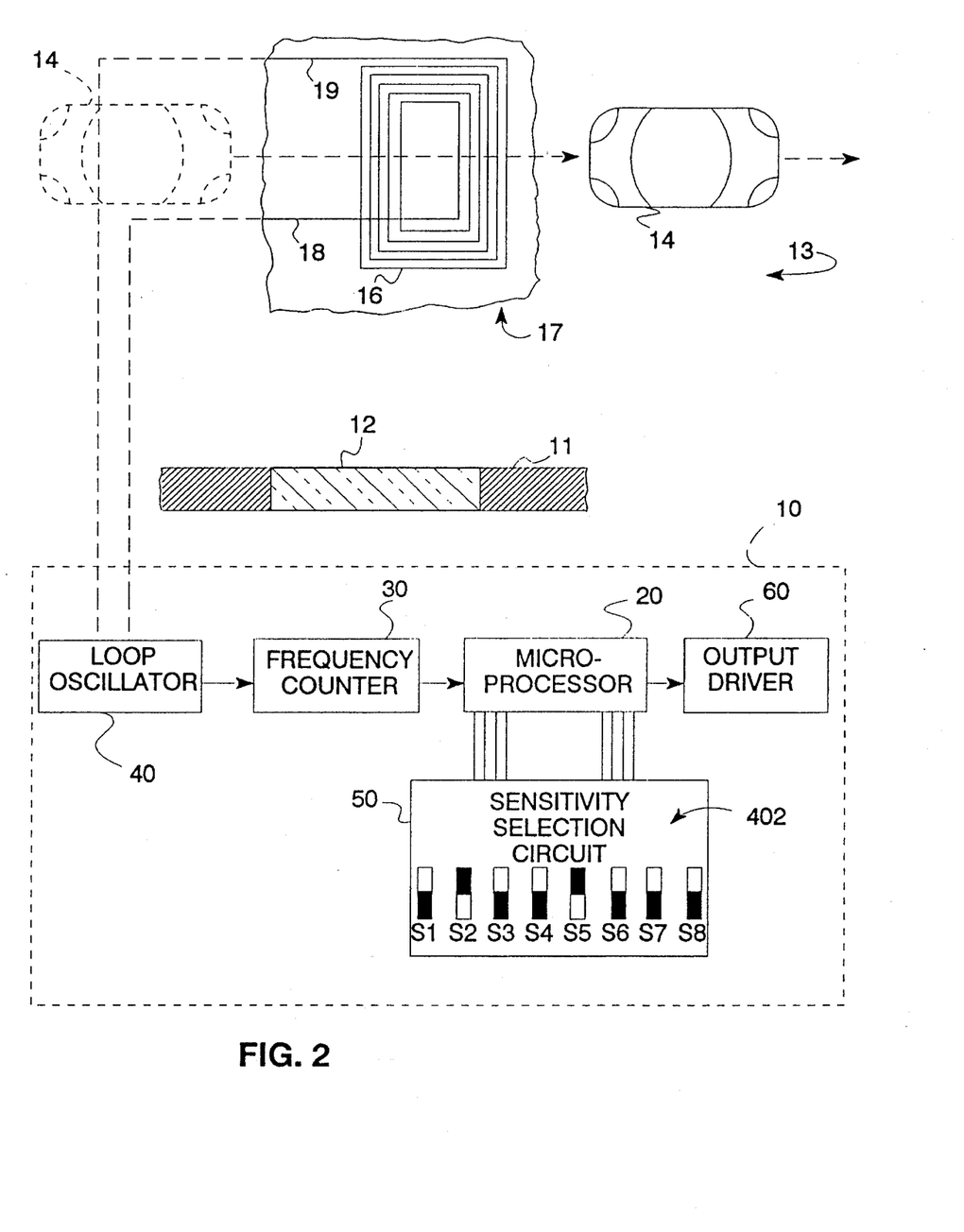
FIG. 2 is a diagrammatic fragmentary sectional plan view of the system of FIG. 1, illustrating a buried inductive loop with a portion of the ground being removed to illustrate the loop.

As best seen in FIG. 2, the system 10 generally includes a microprocessor 20 which is responsive to a frequency counter 30 for generating a DETECTION signal to alert a service representative (not shown) that a customer has arrived at the remote drive-up station 15 and requires assistance. A loop oscillator 40 coupled to the conductive wire loop 16 via a pair of conductors 18 and 19 drive the frequency counter 30 causing its output to change depending upon the presence or absence of a vehicle 14 in the drive up lane 13 adjacent to the drive-up station 15.

The loop oscillator 40 is a resonance tuned device which produces a first or IDLE frequency rate of about 50 KHz whenever a vehicle is not present at the drive-up station 15 and a second or ACTIVE frequency rate of about 50.01 KHz whenever a vehicle is present at the drive-up station 15.

As best seen in FIGS. 1 and 2, the loop 16 is embedded or buried within the drive-up lane 13 at about a depth D. The loop 16 generally includes N number of turns of wire laid in a generally rectangular configuration to define a detection area 17. In this regard, whenever the vehicle 14 enters the detection area 17, the inductance of the loop 16 will be decreased. Conversely, whenever a vehicle leaves the detection area 17, the inductance of the loop 16 returns to an initial inductance value of about 150 microhenries.

The small change in loop inductance from the IDLE to the ACTIVE stages, in turn, results in the output frequency of the loop oscillator 40 changing between the IDLE frequency rate and the ACTIVE frequency rate.

As will be explained hereinafter in greater detail, the system 10 also includes a sensitivity selection circuit, indicated generally at 50, to enable the sensitivity of the loop oscillator 40 to be calibrated for responding to different inductance changes in the loop 16. In this regard, the inductance of the loop in response to a vehicle is a function of the size of the inductive loop 16, the amount of metal in the vehicle 18, the depth (D) at which the loop 16 is embedded within the drive-up lane 14, and the effect of environmental conditions such as temperature, humidity, and the presence or absence of water in the detection area 17.

Considering now the operation of the detection system 10 in greater detail, after the sensitivity circuit 50 has been calibrated, the loop oscillator 40 produces an output frequency of about 50 KHz in the IDLE state. The output of the loop oscillator is then coupled to the frequency counter 40. The frequency counter 40 divides output frequency by a predetermined number M to establish the period of the frequency rate. In the preferred embodiment of the present invention, the number M is 8192.

While the preferred form of the present invention divides the output frequency by 8192, it will be apparent to those skilled in the art that other divisors may be employed depending upon the resonance frequency chosen for the loop oscillator 40.

The microprocessor 20 continually monitors the output signal of the frequency counter 40 to determine an averaged frequency rate. In this regard, the microprocessor 20 samples the output of the counter 40 at about six times per second and then calculates the average of the three frequency readings to determine a current averaged frequency rate $[f_{ave\ (current)}]$. The current averaged frequency rate is defined by equation (1).

$$f_{ave\ (current)} = \frac{f_{current(t_1)} + f_{current(t_2)} + f_{current(t_3)}}{3} \quad (1)$$

The current averaged frequency rate is then summed with a predetermined sense level rate $[f_{sense\ level}]$ established by the sensitivity selection circuit 50 resulting in a current reference frequency $[f_{ref\ (current)}]$, where the current reference frequency is defined by equation 2.

$$[f_{ref(current)}] = [f_{ave(current)} + f_{sense\ level}] \quad (2)$$

The predetermined sense level $[f_{sense\ level}]$ is established when the sensitivity circuit 50 is calibrated and will be described hereinafter in greater detail.

After the current reference frequency has been calculated, it is stored. Then, after a predetermined delay time period of about T seconds, the stored current reference frequency is compared with the then current frequency rate $[f_{current(t_n)}]$ reading, as illustrated by equation (3).

$$[f_{current(tn)}] > [f_{ave(current)} + f_{sense\ level}] \quad (3)$$

In this regard, if the current frequency rate $[f_{current(t_n)}]$ is greater than the current reference frequency rate $[f_{ref\ (current)}]$, the microprocessor 20 will generate an ACTIVE output signal indicative that the system 10 is active and that a vehicle, such as the vehicle 14 has been detected.

When the microprocessor 20 generates the ACTIVE output signal, it causes the output driver 60 to produce an alarm signal to help notify the service representative that a vehicle, such as the vehicle 14, has been detected in the vicinity of the drive up station 15. The microprocessor 20 also causes a light emitting diode 338 to be illuminated to further notify the service representative that the vehicle 14 is present.

Considering now the inductive wire loop 14 in greater detail with reference to FIG. 2, the loop 16 generally includes N number of turns of wire laid in a generally rectangular configuration. In the preferred embodiment of the present invention, the N number of turns in the loop 16 is between about four turns and about eight turns. A more preferred N number of turns is between about five turns and about seven turns, while the most preferred N number of turns is about six turns.

As best seen in FIGS. 1 and 2, the loop 16 is embedded within the drive-up lane 13 in the detection area 17 at about the depth D. The loop 16 is about five feet in width and about one and one-half feet in length. In the preferred embodiment of the present invention, the depth D is sufficiently small so that the distance H between the bottom of the vehicle 14 and the loop 16 is no greater than 10 inches.

For the purpose of clarity, the distances D and H have not been drawn to scale in FIG. 1. It should therefore be understood by those skilled in the art that the distance D is substantially less than the distance H. In this regard, the depth D is between about 1.5 inches and about 2.5 inches. A more preferred depth D is between about 1.75 inches and about 2.25 inches, while the most preferred depth is about 2.00 inches.

Because the inductive loop is buried close to the top surface of the drive-up lane 13, the inductance of the loop 16 is sensitive to environmental conditions. In this regard, as temperature increases from a minimal temperature level of about −40° C., the inductance of the loop 16 will increase. Conversely, when temperature decreases from the nominal level, the inductance will decrease.

With respect to humidity changes, the inductance will decrease when the humidity level increases from a nominal level of about 50% humidity level.

The output frequency of the loop oscillator 40 is a direct function of the input inductance produced by the loop 16. In this regard, the output frequency rate of the loop oscillator 40 decreases in a substantially linear manner as the environmental temperature of the loop 16 increases. Conversely, if the environmental temperature decreases, for example, at the rate of about one degree Centigrade per minute, the output frequency rate change of the loop oscillator 40 will decrease in a nonlinear manner of about 1 to 2 Hz per second.

Figure 4:
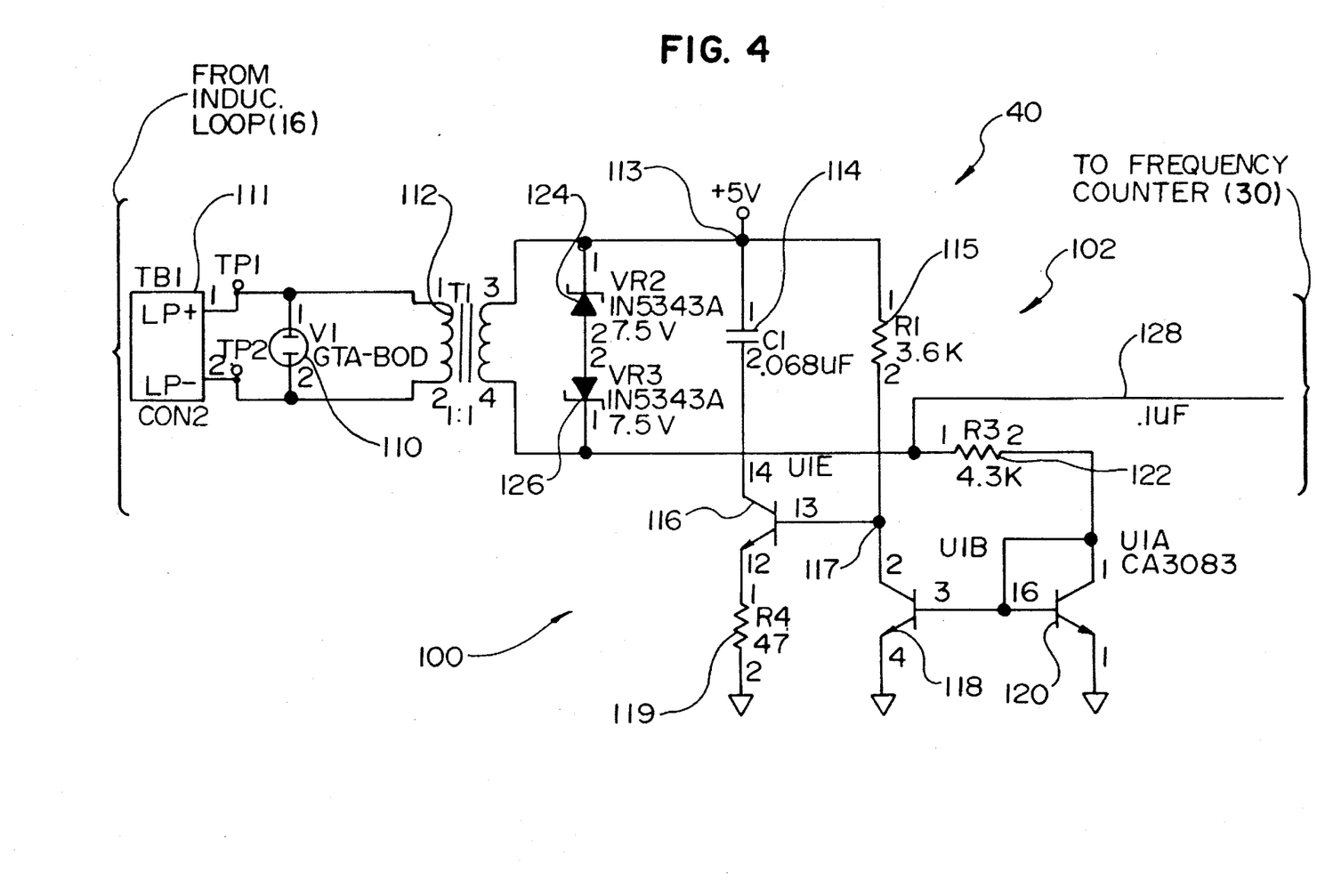
FIG. 4 is a schematic diagram of the loop oscillator of FIG. 2.

Considering now the loop oscillator 40 in greater detail with reference to FIGS. 1 and 4, the loop oscillator 40 is connected between the inductive loop 16 via a terminal board 111 and the input of the frequency counter 30 via a conductor 128. The loop oscillator 40 generally includes a non-inverting oscillator 100 which resonates at about 50 KHz in response to an LC network indicated generally at 102.

The loop oscillator 40 is a tune oscillator whose output frequency rate is determined by the LC network 102 that includes the inductive loop 16 and a 0.068µf capacitor 114. In this regard, the inductive loop 16 is connected, via the terminal board 111, to the primary winding of an isolation transformer 112 which, in turn, couples the inductance of the inductive loop 16 across the capacitor 114. The LC network 102 helps table the resonates of the loop oscillator 40 at about 50 KHz.

A GTA-80D transient suppressor 110 limits any transient signals induced by the loop 16 that may be coupled into the primary winding of the isolation transformer 112.

A pair of transistors 116 and 120, respectively, are coupled together by a 4.3K ohm feedback resistor 122 to form the non-inverting oscillator 100. The transistor 116 has its emitter biased by a 47 ohm resistor 119.

A pair of back to back zener diodes 124 and 126 cooperate together to limit the output voltage of the oscillator 100 to between about plus or minus 7.5 volts. The zener diodes are IN5343A, 7.5 volt diodes.

In order to compensate for temperature variations, the loop oscillator 100 also includes a transistor 118 whose collector is connected between the base of transistor 116 and a 3.6K ohm pull up resistor 115 via a common node 117.

A node 113 couples the oscillator 100 via the capacitor 114 and the pull-up resistor 115 to a plus five volt direct current regulated power source 600 that will be described hereinafter in greater detail.

Figure 5:
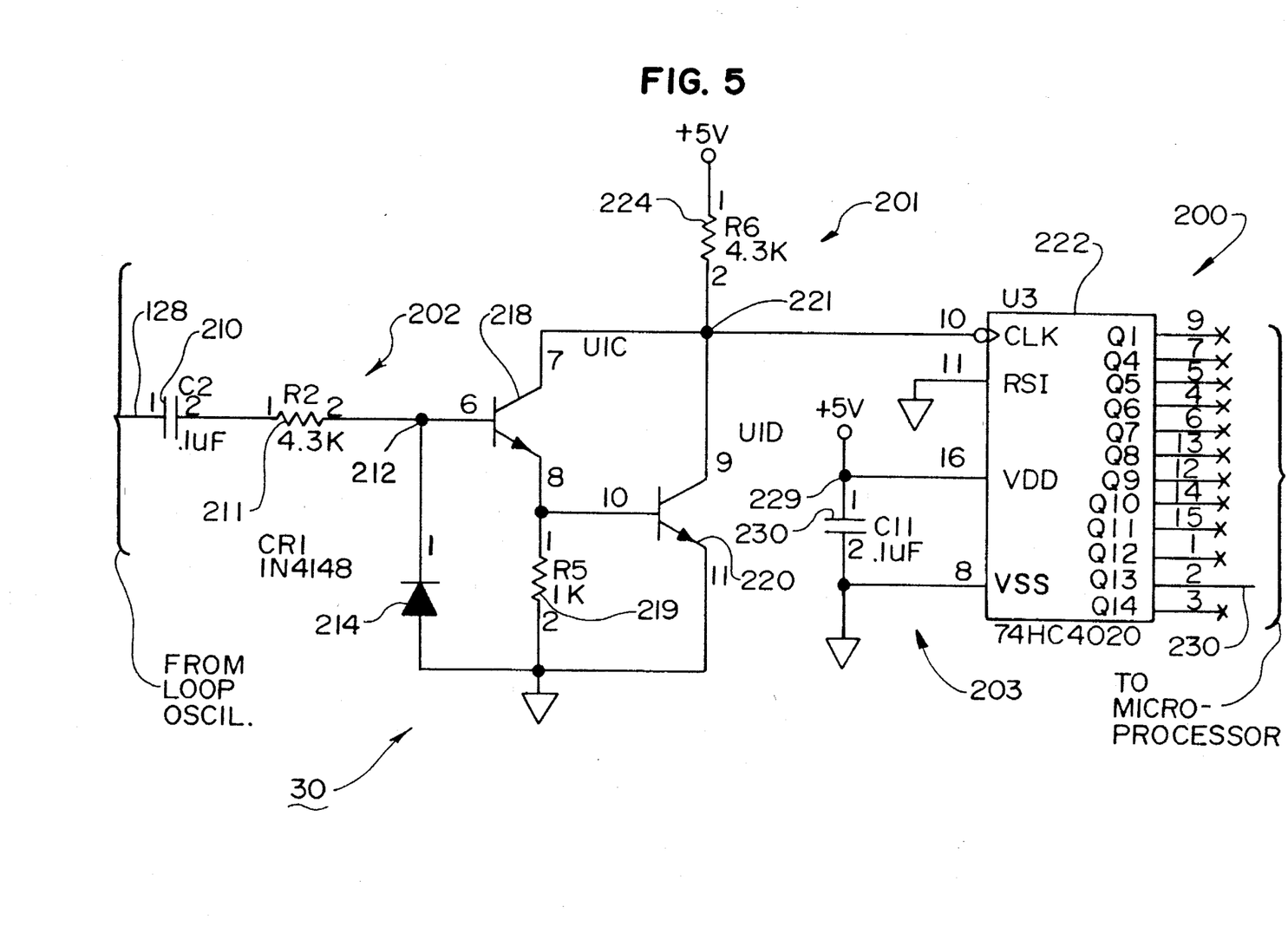
FIG. 5 is a schematic diagram of the frequency counter of FIG. 2.

Considering now the frequency counter 30 in greater detail with reference to FIGS. 2 and 5, the frequency counter 30 generally includes a digital counter 200 and a Darlington arrangement 201 for generating a clock signal to drive the counter 200.

As best seen in FIG. 5, the frequency counter 30 is connected to the output of the loop oscillator 40 via the conductor 128 and the input of the microprocessor 20 via an output conductor 230. The frequency counter 30, also includes a series connected RC network indicated generally at 202, which is coupled to the output of the loop oscillator 40 by the conductor 128. The RC network 200 includes a 0.1µf capacitor 210 for blocking direct current voltage from the loop oscillator 40 and a 4.3K ohm resistor 211 for limiting the input current from the loop oscillator 40.

As best seen in FIG. 5, the resistor 211 is connected between the capacitor 210 and a Darlington input node 212.

A pair of transistors 218 and 220 and a 1K ohm resistor 219 are connected together to form the Darlington arrangement indicated generally at 201 having a substantial current gain. In this regard, the output of the Darlington arrangement 201 is utilized to clock or perform a level shift for the counter 222 that determines the frequency rate of the loop oscillator 40. An output node 221 of the Darlington arrangement 201 is connected to the regulated voltage source 600 via a 4.3K ohm pull up resistor 224.

In order to protect the base emitter junction of transistor 212 from negative voltage breakdown, the frequency counter 30 also includes an IN4148 diode 214 which is coupled between the base of transistor 218 via the node 212 and ground.

Considering now the counter 200 in greater detail with reference to FIG. 5, the counter 200 includes a 74HC4020 fourteen stage ripple carry counter 222 that divides the output frequency of the loop oscillator 40 by 8192 for measuring its period and a filter circuit 203.

The filter circuit 203 includes a 0.1µfarad filter capacitor 230 connected between a power node 229 and ground for helping to eliminate any transient signal from the power source 600 to the counter 222.

Figure 6:
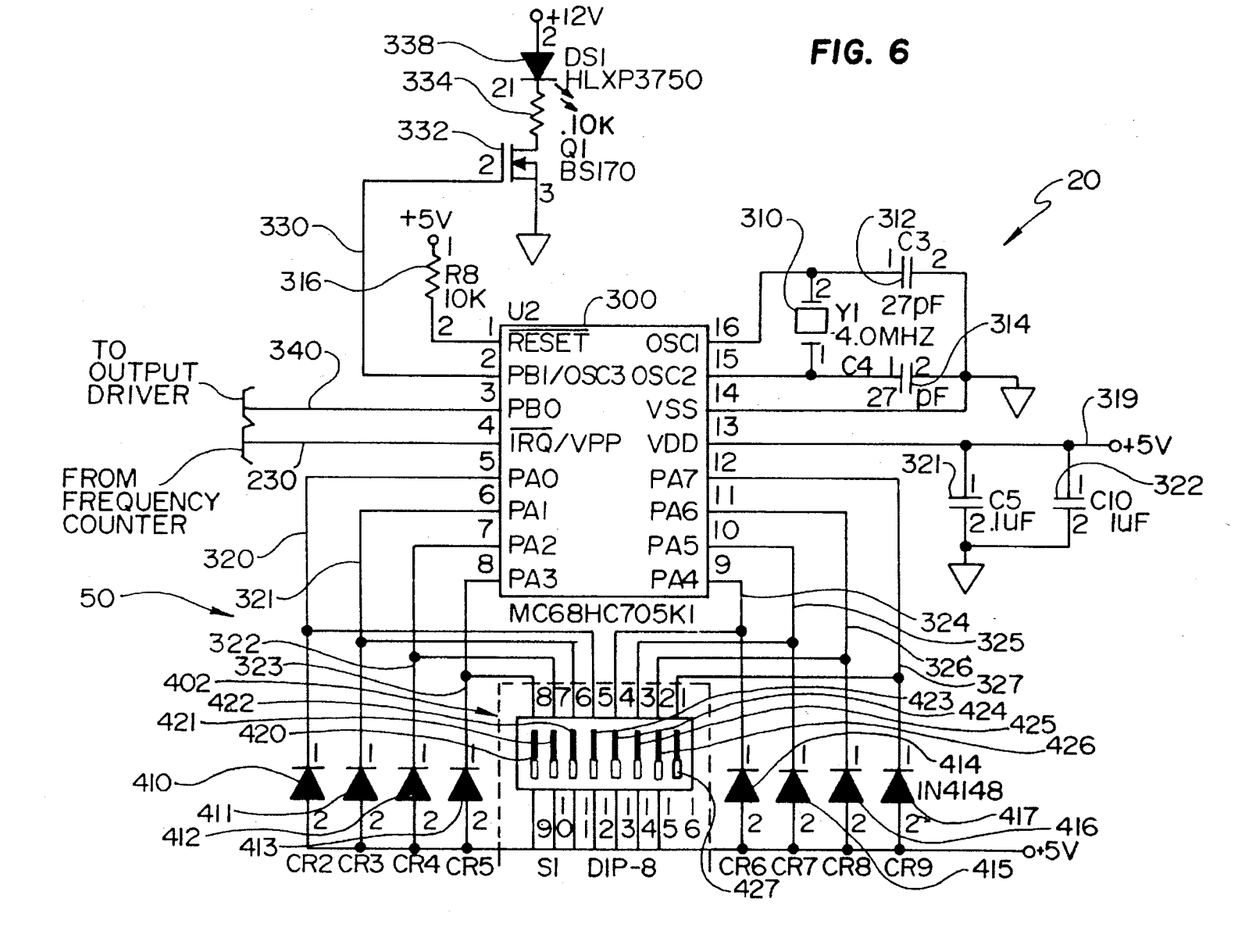
FIG. 6 is a schematic diagram of the microprocessor of FIG. 2.

Considering now the microprocessor 20 in greater detail with reference to FIGS. 2 and 6, the microprocessor 20 is a MC68HC705K18-bit single chip microcontroller 300 having a 4MHz clock arrangement consisting of a 4.0MHz crystal 310 and a pair of 27 picofarad capacitors 312 and 314 respectively. The microprocessor 20 is powered by the regulated power source 600 via a direct current power line 319. A pair of bypass capacitors 321 and 322 help filter any transient on the power line 319.

The microcontroller 300 includes a reset function. In this regard, the reset function is held in a steady state condition via a 10K ohm pull resistor 316 which is connected between the power source 600 and the input $\overline{\text{RESET}}$ on pin 1 of the microcontroller 300.

The firmware of the microcontroller 300 is responsive to the output signal of the frequency counter 30 via the conductor 230 and the output signals PA0–PA7 generated by the sensitivity selection circuit 50. In this regard, the microcontroller 300 has a set of input pins 5–12 that are connected to the sensitivity selection circuit 50 via a set of conductors 320–327 respectively.

In operation, the microcontroller 300 generates two output signals PB1 and PB0 respectively. Signal PB1 is coupled to a light emitting diode 338 via an output conductor 330. In this regard, whenever a vehicle is detected, such as the vehicle 14, the PB1 output signal on output line 330 goes to a logical high causing a light emitting diode 338 to be illuminated. The diode 338 is an HLMP3750 diode and is connected to the output line 330 by a field effect transistor 332 which is connected in series with a 1Kohm current limiting resistor 334.

Considering now the sensitivity selection circuit 50 in greater detail with reference to FIGS. 2 and 6, the sensitivity selection circuit 50 includes a set of diodes 410–417 for helping to establish the sensitivity level of the system. In this regard, diodes 410 and 411 control or establish the amount of delay time that will occur between the detection of a vehicle and the time the microprocessor 20 allows its output signal PB1 to go active. How the delay time is selected will be described hereinafter.

Diodes 412 and 413 control or establish whether the output signal PB1 will be a steady state output signal or a pulsed signal. How the diodes 412 and 413 are selected to establish the type of output signal will be described hereinafter.

As noted earlier, the sensitivity of the inductive loop 16 to large bodies of metal, such as a motor vehicle, is subject to a number of external factors. Some of the external factors, such as the depth at which the inductive loop 16 is embedded within the drive-up lane 13 is fixed. Other factors, such as the amount of metal in the vehicle, the height the base of the vehicle rides above the surface of the ground, and the weather conditions are all variables that may affect the sensitivity of the system relative to proper detection.

Diodes 414–416 enable one of eight different sensitivity levels to be established. Diode 417 helps establish a time out period that will be described hereinafter.

In order to accommodate changing the above-mentioned sensitivity factors, the sensitivity selection circuit 50 also includes a selector bank 402 of dip switches 420–427 for further helping to establish the sensitivity level of the system. In this regard, each of the dip switches 420–427 are connected across individual ones of the diodes 410–417 to enable certain ones of the diodes to be grounded.

The diodes 410–417 when active produce the set of sensitivity signals PA0, PA1, PA2, PA3, PA4, PA5, PA6 and PA7, respectively. In this regard, whenever a dip switch is active, the corresponding sensitivity signal is deactivated. Thus, for example, if switch 420 is active, the sensitivity signal PA3 goes from a logical HIGH to a logical LOW level.

From the foregoing, one skilled in the art will be able to understand that various sensitivity input codes can be easily and conveniently established simply by activating or deactivating corresponding ones of the dip switches 420–427.

Figure 7:
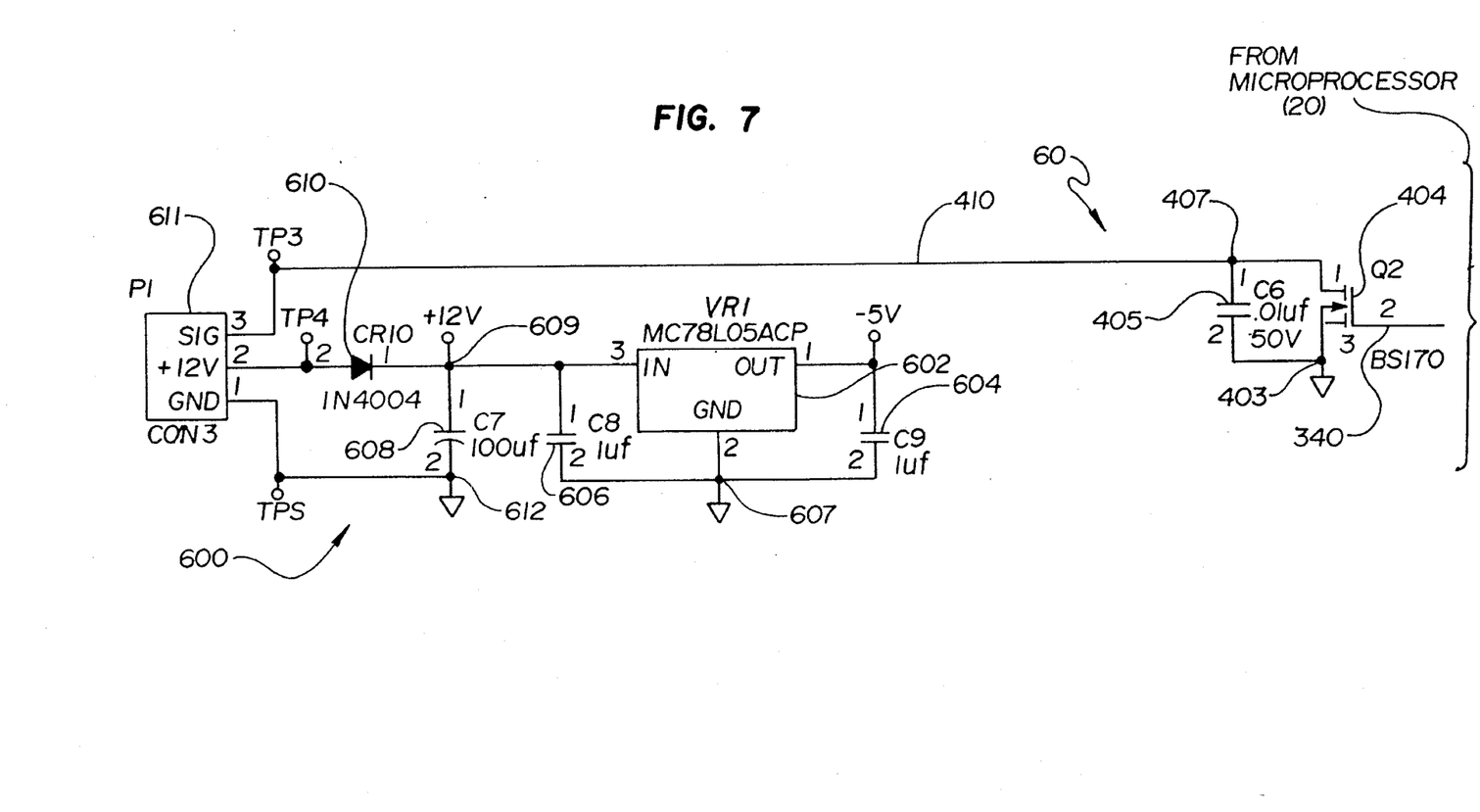
FIG. 7 is a schematic diagram of the output driver of FIG. 2.

Considering now the output driver 60 in greater detail with reference to FIG. 7, the output driver 60 generally includes a BS170 field effect transistor 404 which is coupled to the output of the microprocessor 20 via the output conductor 340. A 0.01μ farad filter capacitor 405 is connected across the transistor 404 between ground at a ground node 403 and a test point node 407. The filter capacitor 407 is for blocking high frequency signals on an output conductor 410.

As best seen in FIG. 7, the output conductor 410 is connected to a connector board 611 to permit the output signal from the driver 60 to be coupled to an alarm device (not shown).

Considering now the voltage regulator 600 in greater detail with reference to FIG. 7, the regulator 600 generally includes an MC78L05ACP voltage regulator 602 that regulates a 12 volt voltage source (not shown) to be about 5 volts and a pair of blocking capacitors 604 and 606 for preventing the regulator 602 from oscillating. The blocking capacitor 604 is a 1μ farad capacitor connected between the output of the voltage regulator 602 at an output pin 1 and ground at a common ground node 607. Capacitor 606 is connected between the input of the voltage regulator 602 at an input pin 3 and the ground node 607.

A diode 610 blocks any negative input voltage to the input of the voltage regulator 602. A filter capacitor 608 filters the input voltage to the voltage regulator 602. The diode 610 is an IN4004 diode having its cathode connected to a common 12 volt node 609 between capacitors 606 and 608 and the input pin 3 of the voltage regulator 602. The capacitor 608 is a 100μ farad capacitor connected between the node 609 and a common ground node 612.

Tables I–IV illustrate the various sensitivity settings that can be established by activating or deactivating corresponding ones of the dip switches.

Table I illustrates that detection can be inhibited for predetermined time periods to help prevent false triggering. In this regard, the detection time period is adjustable in two second intervals from zero seconds (immediate detection) to six seconds (maximum delay).

TABLE I

| DIP SWITCH | DIODE | SECOND OF DELAY | | | |
|---|---|---|---|---|---|
| | | 6 | 4 | 2 | 0 |
| 423 | 410 | OFF | ON | OFF | ON |
| 422 | 411 | OFF | OFF | ON | ON |

Table II illustrates that the duration of the detection signal can be adjusted between a steady state value and a pulse of a given duration for meeting different application requirements; e.g. timing, counting, activating a light, sign, etc. In the preferred form of the present invention, the light emitting diode 338 is activated by a steady state signal.

TABLE II

| DIP SWITCH | DIODE | OUTPUT SIGNAL | | | |
|---|---|---|---|---|---|
| | | 5 SECOND | 3 SECOND | .2 SECOND | STEADY STATE |
| 421 | 412 | OFF | ON | OFF | ON |

TABLE II-continued

| 420 | 413 | OFF | OFF | ON | ON |

Table III illustrates the different sensitivity level setting that accommodate for different types of conductive loops and the depth at which the loop is embedded. The percentage of change is the amount of inductance change required in the inductive loop to establish a valid detection.

TABLE III

| DIP SWITCH | DIODE | PERCENT CHANGE IN LOOP INDUCTANCE ||||||||
|---|---|---|---|---|---|---|---|---|---|
|  |  | .64 | .48 | .32 | .16 | .08 | .04 | .02 | .01 |
| 424 | 414 | OFF | ON | OFF | ON | OFF | ON | OFF | ON |
| 425 | 415 | OFF | OFF | ON | ON | OFF | OFF | ON | ON |
| 426 | 416 | OFF | OFF | OFF | OFF | ON | ON | ON | ON |

Table IV illustrates the different time out settings. In this regard, when the detection of a vehicle results in the system going to an ACTIVE state, the system 10 will remain in the ACTIVE state for only a predetermined time period t, where t is either 20 minutes or 30 minutes. In this regard, when the time out period elapses, the system 10 automatically returns to the IDLE stage even though a vehicle is still present within the detection area 17.

TABLE IV

| DIP SWITCH | DIODE | TIME OUT PERIOD ||
|---|---|---|---|
|  |  | 20 MINUTES | 30 MINUTES |
| 427 | 417 | OFF | ON |

Figure 3:
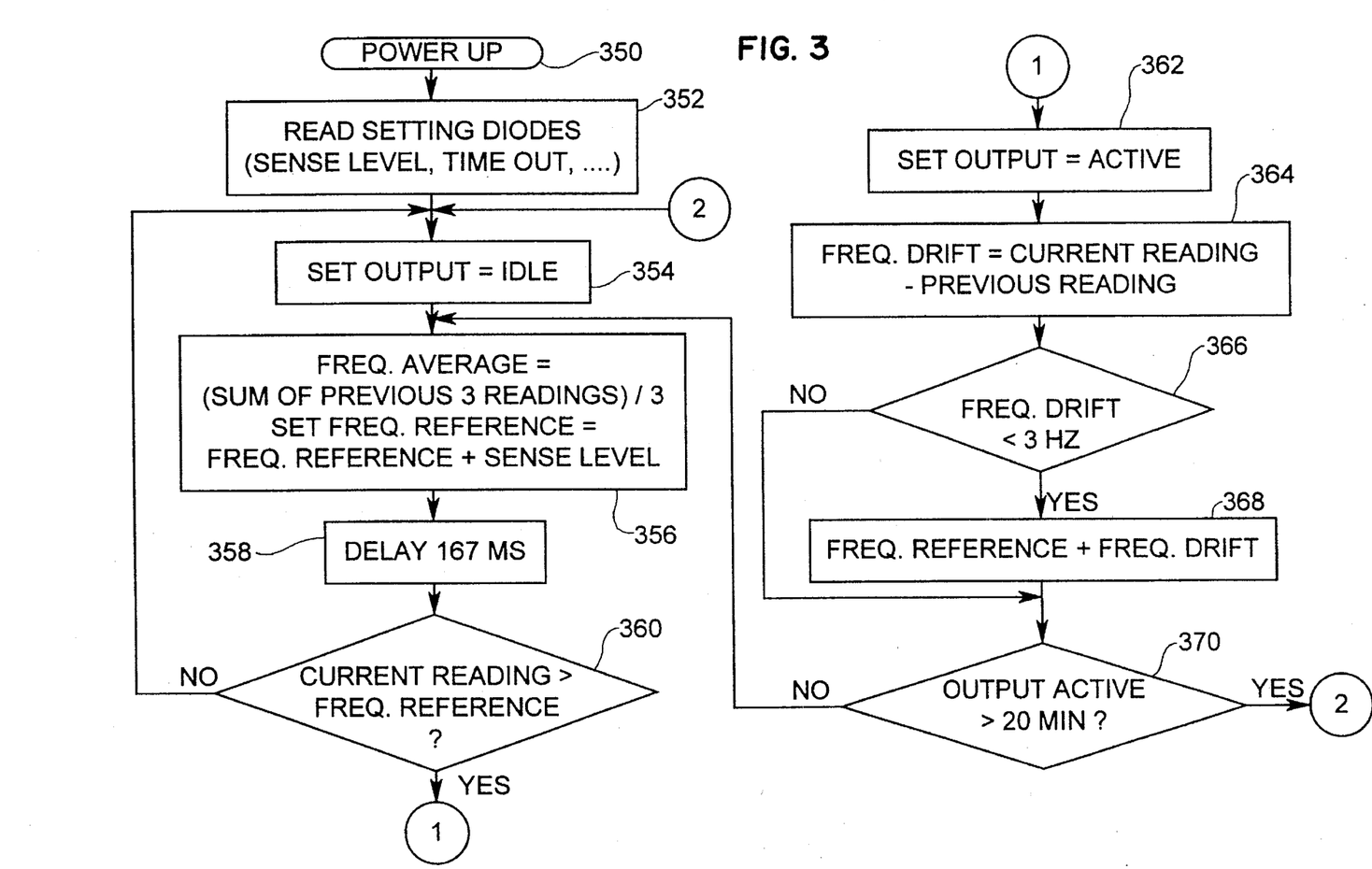
FIG. 3 is a simplified flowchart diagram illustrating the steps executed by the microprocessor of FIG. 2 in determining whether any parameters have changed within a given detection cycle.

Considering now the firmware of the microcontroller 300, with reference to FIG. 3, the microcontroller 300 is initialized when power is applied commencing at box 350. In this regard, at an instruction box 352, the diode settings of diodes 410–417 are read and stored by the microcontroller 300.

The program then proceeds to instruction box 354 and sets the output signal PA1 of microcontroller 300 to a logical LOW which is indicative of the IDLE state.

When the system is in the IDLE state, the microcontroller periodically samples the period of the loop oscillator 40 via the output signal produced by the frequency counter 30. In this regard, approximately every 0.333 seconds, the microcontroller 300 reads and stores the output signal from the frequency counter 30.

The microcontroller 300 utilizes each output signal to calculate and store the current frequency. At instruction box 356, the current averaged frequency rate as defined by equation 1 is calculated and added to the predetermined sense level rate $[f_{sense\ level}]$.

As noted in Table III, a predetermined percentage change in the inductance of loop 16 is required in order for a valid detection to be indicated. This percentage change in inductance corresponds to the predetermined sense change as illustrated in Table V.

TABLE V

| PERCENT CHANGE | SENSE LEVEL RATE (KHz) |
|---|---|
| 0.01 | .0025 |
| 0.02 | .005 |
| 0.04 | .010 |
| 0.08 | .020 |
| 0.16 | .040 |
| 0.32 | .080 |
| 0.48 | .120 |
| 0.64 | .160 |

The program then goes to instruction box 358 and waits. In this regard, the microcontroller waits a sufficient amount of time (about 167 milliseconds) to calculate a new current frequency rate.

At a decision instruction 360, the program determines whether the new current frequency rate has increased a sufficient amount to be indicative of the presence of a vehicle. In this regard, if the current frequency rate is not greater than the current reference frequency rate, the system remains in the IDLE state and returns to instruction 354.

If at decision instruction 360, the current frequency rate is greater than the current frequency reference, the program proceeds to an instruction box 362 that places the system in the ACTIVE state. In this regard, both the output signal PB1 and PB0 of the microprocessor 20 go to a logical HIGH level.

The program then advances to an instruction box 364 to determine whether or not drift in the current frequency is occurring. In this regard, the previous frequency reading sampled by the microcontroller 300 is subtracted from the most recent frequency reading sampled and stored. The result is an indication of whether or not frequency drift has occurred.

The program then advances to a decision instruction 366 to determine whether the calculated frequency drift is less than 3 Hz. If the calculated frequency drift is greater than 3 Hz, the program assumes this is not drift and advances to another decision instruction 370.

At decision instruction 370, the program determines whether the system has remained in the ACTIVE state for a certain predetermined time period t, where t can be either 20 minutes or 30 minutes, depending upon the sensitivity setting of dip switch 417.

If the system has not been in the ACTIVE state for longer than the time period t, the system program returns to instruction box 358 and proceeds as previously described.

If the system has been in the ACTIVE state for longer than the time period t, the system program exits the ACTIVE state by returning to instruction box 354 and proceeds as previously described.

Considering again decision instruction 366, if the calculated frequency drift is less than 3 Hz, the program goes to instruction box 368 and calculates a new current frequency reference. In this regard, previous current frequency reference is adjusted by adding it to the calculated frequency drift as illustration is equation (4).

$$[\ f_{ref(current)} = [f_{ref(previous)}] + f_{drift}]  \quad (4)$$

The program then advances to instruction 370 and proceeds as previously described.

Figure 8A:
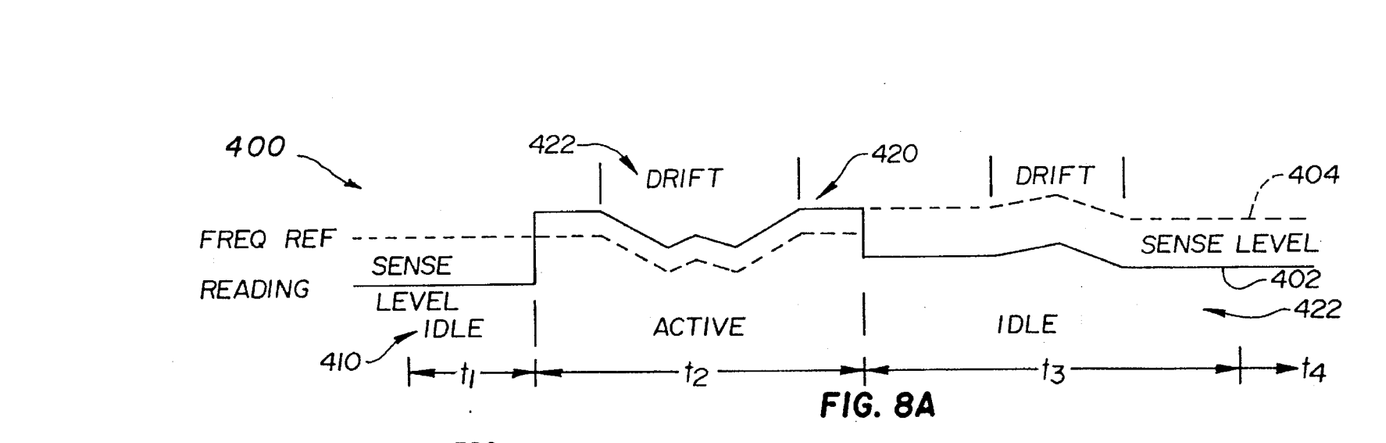
FIGS. 8A–8C are timing diagrams illustrating the idle and active stages of the vehicle detection system of FIG. 1.
Figure 8B:
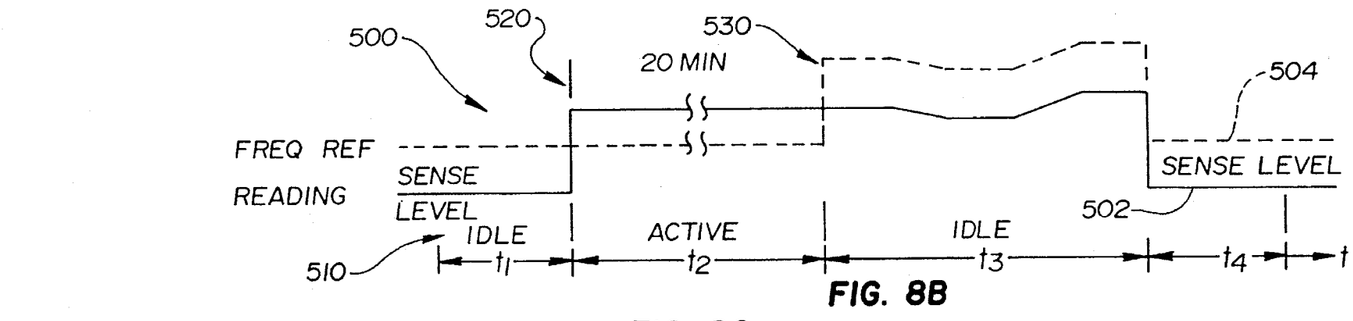
Figure 8C:
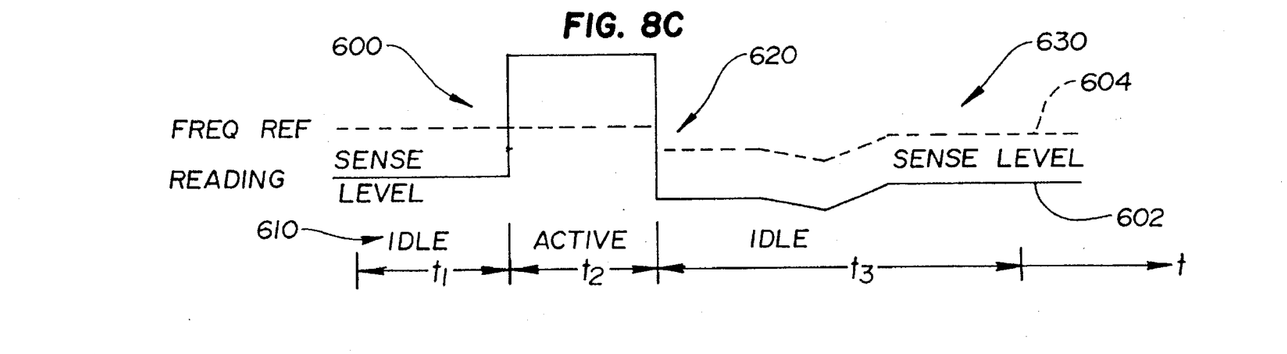

Referring now to FIGS. 8A–8C, there are illustrated three timing diagrams 400, 500 and 600, respectively.

Timing diagram 400 illustrates a series 402 of current frequency readings relative to a series 404 of current reference frequency values. In this regard, during an initial time period $t_1$, the current frequency readings 402 remain below the current reference frequency 404 and thus, the system remains in an IDLE state, shown generally at 410.

Referring now to FIG. 8A, at the beginning of a next time period $t_2$, the current frequency reading 402 is greater than the current reference frequency 404. In this regard, the system goes from the IDLE state 410 to an ACTIVE state shown generally at 420. While in the ACTIVE state 420, the output frequency of the loop oscillator 40 begins to drift for a period of time indicated generally at 422.

As the output frequency of the loop oscillator 40 drifts, the system 10 compensates for the drift by readjusting the current reference frequency 404. In this regard, FIG. 8A illustrates that as the current frequency rate 402 drifts, the current reference frequency rate 404 is adjusted to compensate for the drift.

At the end of time period $t_2$, the current frequency reading 402 drops below the current reference frequency 404 and thus, the system returns to another IDLE state 422.

While the system is in the idle state, the current reference frequency 404 is continually adjusted for drift in the same manner as it was while the system was in the ACTIVE state.

FIG. 8B illustrates a series 502 of current frequency readings relative to a series 504 of current reference frequency values. In this regard, during an initial time period $t_1$, the current frequency reading 502 remains below the current reference frequency 504, and thus, the system remains in the IDLE state shown generally at 510.

Referring to FIG. 8B, at the beginning of a next time period $t_2$, the current frequency reading 502 is greater than the current reference frequency 504. In this regard, the system goes from the IDLE state 510 to an ACTIVE state shown generally at 520. While in the ACTIVE state 520, the loop oscillator 40 is substantially stable for the entire time period $t_2$.

At the end of time period $t_2$, the system time out feature is activated indicating that a vehicle, such as the vehicle 14, has remained at the drive-up station 15 for longer than the time out period t. At the end of the time out period $t_1$, the system returns to another IDLE state indicated generally at 530. In this regard, at the beginning of a next time period $t_3$, the system recalculates the current reference frequency rate 504 which is substantially higher than the current reference frequency during time period $t_2$.

During time period $t_2$ the current frequency reference 504 is compensated for drift but remains at the higher rate, until the vehicle 14 departs from the detection area 17. From the foregoing, it should be understood by those skilled in the art, that when the system returned to the IDLE state 530, it was prevented from again entering another ACTIVE state (not shown) until the vehicle 14 departed from the drive-up station 15.

Referring now to FIG. 8C, timing diagram 600 illustrates a series 602 of current frequency readings relative to a series of current reference frequency values. In this regard, during an initial time period $t_1$, the current frequency reading 602 remains below the current reference frequency 604, and thus, the system remains in an IDLE state shown generally at 610.

At the end of $t_1$, the current frequency 602 exceeds the current reference frequency 604 and then the system advances to an ACTIVE state shown generally at 620 for a time period of $t_2$.

At the end of time period $t_2$, the current frequency drops below the current reference frequency 604. In this regard, the system returns to another IDLE state shown generally at 630.

While the system remains in the IDLE state 630, both the current frequency 602 and the current reference frequency 604 change in like amounts to compensate for drift.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A detection system for use with a conductive wire loop having a given inductance, said given inductance being subject to change by the effect of at least one external element, comprising:

loop oscillation means coupled to the conductive wire loop for generating an output frequency rate, said output frequency rate including an idle frequency rate during a non-detection time period interval and an active frequency rate during a detection time period interval;

said idle frequency rate and said active frequency rate being subject to small incremental frequency rate changes caused by external condition changes;

drift detection means responsive to said loop oscillation means for generating an idle drift correction signal whenever the output frequency rate of said loop oscillation means drifts by less than a predetermined percentage of a threshold value, said threshold value being equal to a reference frequency rate, said reference frequency rate being dependent upon external changes in temperature or humidity;

frequency rate referencing means responsive to said idle drift correction signal for adjusting said reference frequency rate during said non-detection time period interval to help prevent false detections during said non-detection time period interval;

detection determination means for generating an active detection signal whenever the output frequency rate of said loop oscillation means changes by more than a predetermined percentage of said threshold value; and drift compensation means responsive to said active detection signal for changing said reference frequency rate by a small incremental value to help prevent interruption of a valid detection resulting from external changes in temperature or humidity during said detection time period interval.

2. A detection system according to claim 1, wherein loop oscillation means is a loop oscillator coupled to the conductive wire loop.

3. A detection system according to claim 1, wherein said frequency rate referencing means includes: frequency rate of said loop oscillation means;

means for calculating a current averaged frequency rate, said current averaged frequency rate being the average frequency rate of the output frequency rate as determined over a predetermined time period; and means for storing temporarily the averaged current frequency rate.

4. A detection system according to claim 1, wherein said frequency rate referencing means includes:

means for storing temporarily said reference frequency rate for comparing it subsequently with a current reference frequency rate, said current reference frequency rate being defined by an equation:

where $f_{sense\ level}$ is a predetermined sense level established by said frequency rate referencing means and where $f_{ave(current)}$ is a current averaged frequency rate, said current averaged frequency rate being the average frequency rate of the output frequency rate as determined over a predetermined period of time.

5. A detection system according to claim 4, wherein said detection determination means includes:

means for comparing the stored reference frequency rate with said current reference frequency rate and for generating a calculate signal when the current reference frequency rate is less than the stored reference frequency rate;

said calculate signal being indicative that the inductance of the conductive wire loop has not substantially changed.

6. A detection system according to claim 5, wherein said detection determination means further includes:

means for generating said detection signal when the current reference frequency rate is greater than the stored reference frequency rate.

7. A detection system according to claim 1, wherein said drift compensation means includes:

means for storing temporarily a current reference frequency rate, said current reference frequency rate being defined by an equation:

where $f_{sense\ level}$ is a predetermined sense level established by said frequency rate referencing means and where $f_{ave(current)}$ is a current averaged frequency rate, said current averaged frequency rate being the average frequency rate of the output frequency rate as determined over a predetermined period of time;

timing means for determining a sample rate to help establish whether said current averaged frequency rate has changed by a small incremental value;

algorithm means for comparing the current reference frequency rate with previously stored current reference frequency rate and for calculating said small incremental value when the current reference frequency rate is different than the previously stored reference frequency rate;

calculate means responsive to said algorithm means for determining a modified reference frequency rate when the current reference frequency rate is different than the previously stored reference frequency rate; and means for storing said modified reference frequency rate as a new reference frequency rate.

8. A system according to claim 1, wherein said predetermined percentage of said reference frequency rate is adjustable between a maximum percentage and a minimum percentage.

9. A system according to claim 8, wherein said maximum percentage is about 0.64% and wherein said minimum percentage is about 0.01%.

10. A system according to claim 8, wherein said maximum percentage is about 0.48% and wherein said minimum percentage is about 0.02%.

11. A system according to claim 8, wherein said maximum percentage is about 0.32% and wherein said minimum percentage is about 0.04%.

12. A system according to claim 8, wherein said maximum percentage is about 0.16% and wherein said minimum percentage is about 0.08%.

13. A system according to claim 1, wherein said detection signal is a steady state signal.

14. A system according to claim 1, wherein said detection signal is a pulsed signal having an adjustable duration.

15. A system according to claim 14, wherein said adjustable duration is between about five seconds and about two seconds.

16. A detection system according to claim 1, further comprising:

time out means coupled to said detection determination means for generating a recalculate signal after a predetermined maximum detection time period interval;

said recalculate signal causing said frequency rate referencing means to determine a new reference frequency rate and said detection determination means to reset said detection signal if it was in a previously set condition.

17. A detection system according to claim 16, wherein said time out means includes override means for causing said detection signal to be reset when said detection time period interval exceeds a time out period of between about twenty minutes and about thirty minutes.

18. A detection system according to claim 1, further comprising delay means for inhibiting said detection determination means from generating a detection signal for a predetermined delay time even though the output frequency rate of said loop oscillation means is changed by more than said predetermined percentage of said reference frequency rate;

whereby false triggering is substantially prevented due to sudden changes in the inductance of the conductive wire loop.

19. A detection system according to claim 18, wherein said predetermined delay time is adjustable between about six seconds and two seconds to help prevent false triggering.

20. A detection system according to claim 1, wherein said small incremental value and said another small incremental value are substantially equal.

21. A detection system according to claim 1, wherein said small incremental value and said another small incremental value have substantially different values.

22. A detection system according to claim 1, wherein said frequency rate referencing means includes means for determining a detection reference frequency rate whenever said detection time interval exceeds a predetermined maximum detection time period interval.

23. A detection system according to claim 1, wherein said frequency rate referencing means includes:

sensitivity selection means for helping to define a sufficient inductance change to be indicative of a valid detection.

24. A detection system according to claim 23, wherein said sensitivity selection means includes:

diodes means for generating binary signals indicative of the required percentage change in the inductance of said conductive wire loop to define said valid detection; and switch means for changing the binary signals selectively to desired required percentage change values.

25. A method for helping to prevent false detections in a detection system used with an inductive wire loop disposed in an environment subject to temperature and humidity changes comprising:

using loop oscillation means coupled to the wire loop;

generating an output frequency rate, said output frequency rate including an idle frequency rate during a non-detection time period interval and an active frequency rate during a detection time period interval;

said idle frequency rate and said active frequency rate being subject to small incremental frequency rate changes caused by external changes in temperature or humidity;

generating and idle drift correction signal whenever the output frequency rate of said loop oscillation means drifts by less than a predetermined percentage of a threshold value, said threshold value being equal to a reference frequency rate, said reference frequency rate being dependent upon external changes in temperature or humidity;

adjusting said reference frequency rate during said non-detection time period interval to help prevent false detections during said non-detection time period interval;

generating an active detection signal whenever the output frequency rate of said loop oscillation means changes by more than a predetermined percentage of said threshold value; and changing said reference frequency rate by a small incremental value to help prevent false interruption of a valid detection resulting from external changes in temperature or humidity during said detection time period interval.

26. A detection system, comprising:

a conductive wire loop having a given inductance, said given inductance being subject to change by the effect of at least one external element;

loop oscillation means coupled to said conductive wire loop for generating an output frequency rate, said output frequency rate including an idle frequency rate during a non-detection time period interval and an active frequency rate during a detection time period interval;

said idle frequency rate and said active frequency rate being subject to small incremental frequency rate changes caused by external condition changes;

drift detection means responsive to said loop oscillation means for generating an idle drift correction signal whenever the output frequency rate of said loop oscillation means drifts by less than a predetermined percentage of a threshold value, said threshold value being equal to a reference frequency rate, said reference frequency rate being dependent upon external changes in temperature or humidity;

frequency rate referencing means responsive to said idle drift correction signal for adjusting said reference frequency rate during said non-detection time period interval to help prevent false detections during said non-detection time period interval;

detection determination means for generating an active detection signal whenever the output frequency rate of said loop oscillation means changes by more than a predetermined percentage of said threshold value; and drift compensation means responsive to said active detection signal for changing said reference frequency rate by a small incremental value to help prevent interruption of a valid detection resulting from external changes in temperature or humidity during said detection time period interval.

* * * * *

UNITED STATES PATENT AND TRADEMARK OFFICE
CERTIFICATE OF CORRECTION

PATENT NO : 5,512,891
DATED : April 30, 1996
INVENTOR(S): Chao M. Kang

It is certified that error appears in the above-identified patent and that said Letters Patent is hereby corrected as shown below:

Column 13, line 2, after "includes:", insert --a frequency counter for determining the output--.

Column 13, line 53, after "with" and before "previously", insert --a--.

Signed and Sealed this

Twenty-fourth Day of June, 1997

Attest:

BRUCE LEHMAN

*Attesting Officer*   *Commissioner of Patents and Trademarks*